United States Patent [19]

Sytsma

[11] Patent Number: 4,863,293

[45] Date of Patent: Sep. 5, 1989

[54] SEALED BEARING ASSEMBLY

[75] Inventor: Frederick R. Sytsma, Grand Rapids, Mich.

[73] Assignee: Frost Inc., Grand Rapids, Mich.

[21] Appl. No.: 244,324

[22] Filed: Sep. 15, 1988

[51] Int. Cl.[4] .............................................. F16C 33/78
[52] U.S. Cl. ................................... 384/482; 384/477; 384/489; 277/95
[58] Field of Search ............... 384/482, 489, 477, 140, 384/143, 151, 153; 277/95

[56] References Cited

U.S. PATENT DOCUMENTS

| | | |
|---|---|---|
| 1,505,552 | 8/1924 | Garner et al. . |
| 2,144,691 | 1/1939 | Schmal . |
| 2,277,810 | 3/1942 | Zotter . |
| 2,706,650 | 4/1955 | Saywell . |
| 2,714,022 | 7/1955 | Nelson, Jr. . |
| 2,888,304 | 5/1959 | Kooistra . |
| 2,945,730 | 7/1960 | Murray et al. . |
| 3,142,520 | 7/1964 | Mueller . |
| 3,179,331 | 4/1965 | Paschke et al. . |
| 3,245,573 | 4/1966 | Sikora . |
| 3,279,803 | 10/1966 | Sekulich . |
| 3,537,725 | 11/1970 | Frost . |
| 3,639,016 | 2/1972 | Bourgeois . |
| 3,658,396 | 4/1972 | Taylor . |
| 3,717,394 | 2/1973 | Pitner . |
| 3,899,226 | 8/1975 | Frost et al. . |
| 3,923,351 | 12/1975 | Frost . |
| 3,998,505 | 12/1976 | Frost et al. . |
| 4,010,987 | 3/1977 | Jasperse et al. . |
| 4,054,335 | 10/1977 | Timmer ............................ 384/482 |
| 4,113,328 | 9/1978 | Van Der Meulen . |
| 4,265,133 | 5/1981 | Van Der Meulen . |
| 4,309,063 | 1/1982 | Weis . |
| 4,502,738 | 3/1985 | Nauta ............................... 384/477 |
| 4,516,785 | 5/1985 | Mitsue et al. . |
| 4,530,609 | 7/1985 | Jasperse et al. . |
| 4,605,318 | 8/1986 | Kaiser ................................ 277/95 |

FOREIGN PATENT DOCUMENTS 675146 7/1952 United Kingdom .

Primary Examiner—Lenard A. Footland
Attorney, Agent, or Firm—Price, Heneveld, Cooper, DeWitt & Litton

[57] ABSTRACT

A sealed bearing assembly including an inner race, an outer race, and a plurality of balls forming therewith a bearing, a pair of closure members along the sides thereof, and a pair of identical annular seals positioned between the bearing and the closure members, is constructed such that an annular pocket is formed by the seals about the rolling elements. The seals act to confine lubricating material within the pocket to only the specific volume where it is needed. The seals not only preclude seepage of the lubricating material, but also facilitate the economical use of modern greases.

22 Claims, 3 Drawing Sheets

SEALED BEARING ASSEMBLY

BACKGROUND OF THE INVENTION

The present invention pertains to sealed bearing assemblies, which are particularly useful in forming trolley wheels.

Trolley systems are employed extensively as overhead or in-floor motive arrangements in manufacturing processes. Typically, semi-precision bearings are utilized in this environment to rollingly support a trolley adapted to transport workpieces, tools, etc., for movement along a track. Semi-precision bearings are well suited to this task due to the inherent clearance or "play" or looseness incorporated in their construction. More specifically, the looseness of the bearing enhances its ability to maneuver curves, pass smoothly over debris that may be on the track, and accommodate element expansion in processes involving large temperature gradients.

Yet, despite the number of advantages gained, the construction thereof providing the desired looseness has also been responsible for several notable shortcomings. Firstly, loose bearings are difficult to seal due to the relatively large radial and axial excursions of the rotating components. Most seals have a comparatively limited ability to follow such excursions and continue sealing. Secondly, because of the loose construction and the difficulty of conventional seals to remain in sealing contact, the grease contained within semi-precision bearings does, on occasion, seep out, drip onto and spoil the goods being manufactured. Thirdly, semi-precision bearings include a relatively large amount of enclosed open space which is filled with the lubricating grease. In the past, the consumption of such large amounts of grease has been inconsequential due to the low cost of conventional greases. However, technologically advanced greases—offering increased lubrication capabilities, longer lifespans, increased usefulness in high temperatures, etc.—are very expensive and have, heretofore, been essentially limited economically to precision bearings.

SUMMARY OF THE INVENTION

The aforementioned problems are overcome in the present invention, wherein bearing assemblies having unique seal arrangements alleviate the risk of dripping grease and facilitate the economic use of the new, expensive greases.

The sealed bearing assembly of the present invention includes a raceway, a closure member positioned along the side thereof and a seal assembly which forms a leak-resistant pocket about the raceway for enclosing and retaining the grease. Hence, the risk of dripping grease from the bearing is effectively obviated. Also, the grease is confined to only the specific area where bearing lubrication is needed. This facilitates the economical use of modern greases. Further, the present seal assembly is of a resilient nature which not only effects easy mounting within the bearing without fastener members, but also accommodates the inherent radial clearance and "end play" of the semi-precision bearing without jeopardizing the desired seal.

Preferably, the seal assembly includes at least one annular, resilient body formed from a fluoroelastomer having a cup-shape, an inwardly extending flange supporting the body on a shoulder of the inner race, and a pair of spaced, sealing/end faces which engage the sidewalls of one of the closure members. Notches may be included on the sealing faces to prevent vacuum formation between the seal and the closure member, and consequent grease siphoning/pumping from the lubrication pocket. These and other objects, advantages and features of the present invention will be more fully understood and appreciated by reference to the written specification and appended drawings.

DETAILED DESCRIPTION OF THE PREFERRED EMBODIMENT

Figure 1:
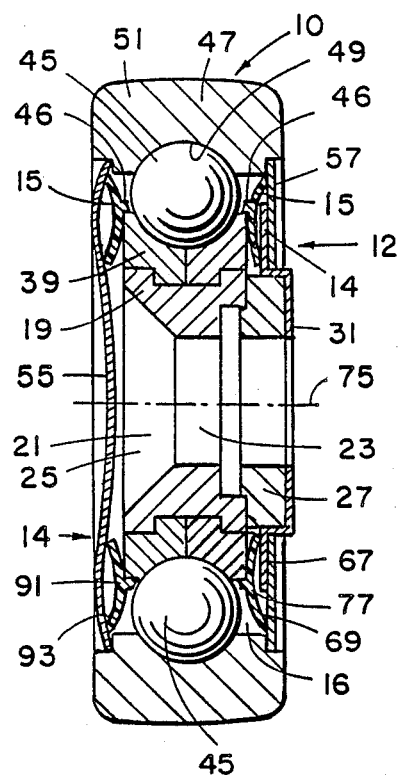
FIG. 1 is a cross-sectional view of a bearings assembly of the present invention.

In the preferred embodiment, sealed bearing assembly 10 includes a plurality of balls 45 bordered on opposite sides by shield or seal assembly 14 (FIGS. 1 and 3) Seal assembly 14 is formed by a pair of identical annular seals 15 which collectively define therebetween an annular pocket 16 designed to confine the lubricating grease only to the path traveled by the balls 45. This construction enables use of costly commercially available greases providing an extended life and high temperature resistance.

Figure 3:
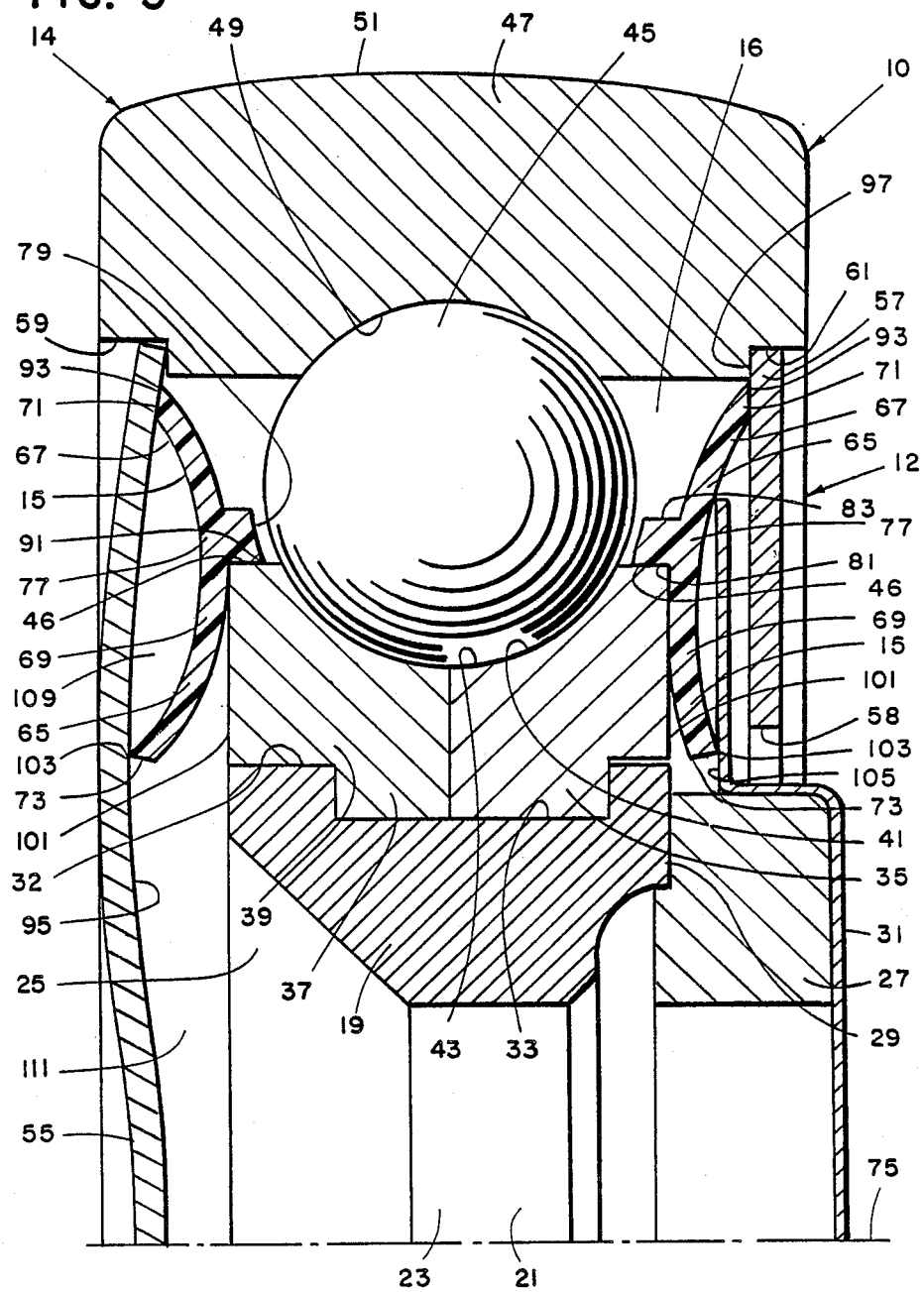
FIG. 3 is an enlarged, fragmentary, cross-sectional view of one-half of the bearing assembly of FIG. 4 is an end view of the seal.

Bearing assembly 10, in the preferred embodiment, further includes a mounting structure, by which it is coupled to a trolley or carriage (not shown), comprised of a hub 19, a collar or spacer 27 and a seal member 31 (FIGS. 1 and 3). Hub 19 has an annular configuration which defines a central aperture 21 adapted to receive therethrough a bolt, rivet, axle or the like for coupling assembly 10 to the trolley or carriage (not shown). Central aperture 21 is divided into two adjacent portions 23, 25; first portion 23 is cylindrical in shape to matingly receive th fastening member and second portion 25 is frustoconically shaped to taper outwardly away from first portion 23 and abut the head of the fastening member for its retention. Annular collar 27 is in abutment with side 29 of hub 19, opposite second portion 25, so as to be positioned in tight frictional engagement between hub 19 and a trolley brace (not shown). Rigid, metallic seal member 31, also annular in shape, is contiguously wrapped about collar 27 to alleviate the risk of entrapping and accumulating dirt and debris within bearing assembly 10.

Outer peripheral surface 32 of hub 19 includes a substantially U-shaped groove 33 adapted to receive, mount and retain together therein a pair of inner race elements 35, 37 collectively forming the inner race 39. More specifically, each inner race element 35, 37 defines an annular arcuate hollow 41, which cooperates with each other to form the arcuate inner race 39 adapted to receive and rollingly support a plurality of balls 45. Preferably, assembly 10 is a full complement bearing having balls 45 spaced around raceway elements 35, 37 and 39 generally immediately adjacent one another. Inner race 39 further includes a marginal peripheral surface or shoulder 46 on each side thereof to effect mounting of seals 15, as will be described below.

Positioned concentrically around inner race 39 is a corresponding outer race 47. Outer race 47 includes a complementary outer channel 49, opposed to inner race 39, to receive and rotatably confine balls 45 within bearing assembly 10. Preferably, outer peripheral surface 51 thereof functions to form the trolley wheel which is rollingly supported for movement along a track or rail (not shown).

Securely attached to opposite sides of bearing assembly 10 is a pair of closure members 55, 57. Closure members 55, 57 perform the dual role of integrally cooperating with shield assembly 14 to form a portion of the grease containing pocket 16, and enclosing the sides of bearing 10 to substantially bar the accumulation of dirt and debris from collecting therein. Annular recesses 59, 61 are formed in the sides of outer race 47 to securely mount closure members 55, 57 into place. Preferably, closure member 55, also known as a welsh plug, initially has a dome-shaped disk configuration, which is flexed or "oil-canned" within recess 59 to press and urge its outer periphery tightly into recess 59 for secure retention. Closure member 57 is an annular member having a central aperture 58 securely press-fit into recess 61 via its outer periphery for mounting.

Figure 2:
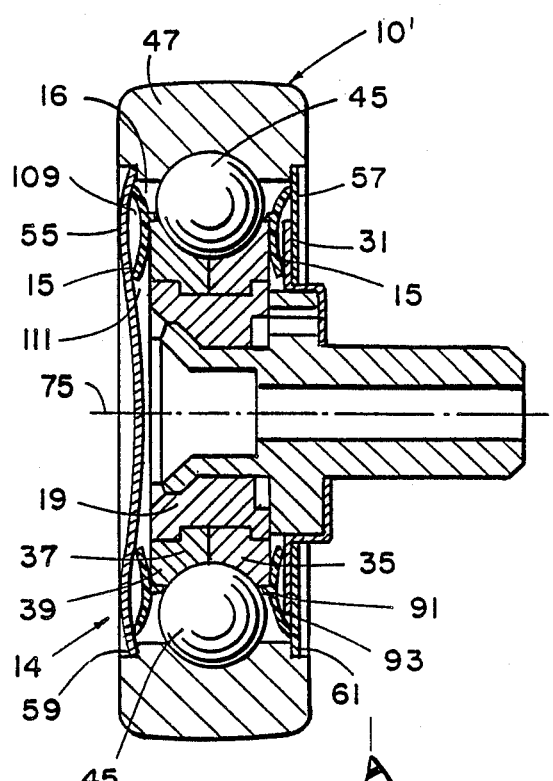
FIG. 2 is a cross-sectional view of a second embodiment of the present invention.

Shield assembly 14 includes a pair of identical, annular seals 15 (FIGS. 4-6) which are mounted on opposite sides of balls 45 to thereby define an annular pocket 16 (FIGS. 1-3. To ensure a secure sealing arrangement in spite of the inherent "play" of a semi-precision bearing, seal 15 is preferably composed of a fluoroelastomer which is flexible and has excellent memory and resiliency, high temperature resistance, toughness, tear and chemical resistance, such as VITON (trademark of E.I. DuPont de Nemours & Co., Inc.). However, other suitable materials could also be utilized. Moreover, the resilient nature of seals 15 enable their mounting within assembly 10 without the need for any fastening members.

Figure 5:
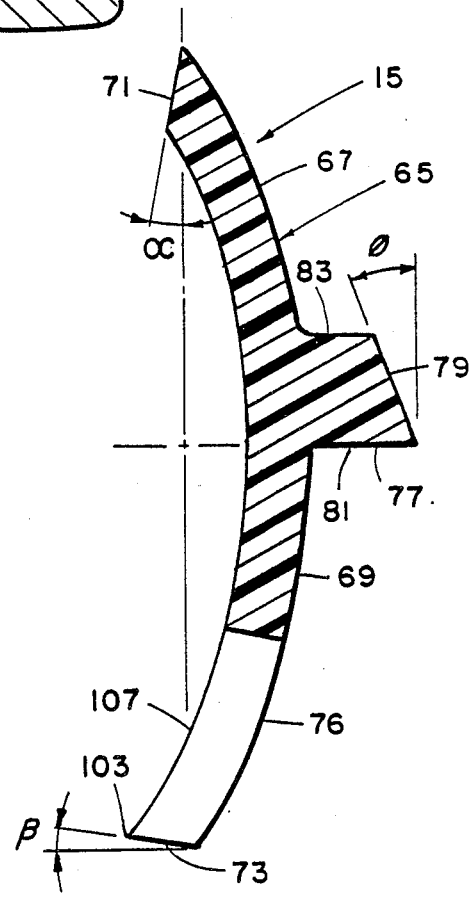
FIG. 5 is a cross-sectional view of a seal of the present invention taken along line IV—IV of FIG. 4.

Each seal 15 includes an annular, substantially cup-shaped body 65 having a pocket segment 67 and a stabilizing segment 69 (FIGS. 1-6). Segments 67, 69 collectively form a smooth continuous body 65, and are discussed as segments only to reflect their functional differences, as will be described further below. Pocket segment 67 defines a radially outermost sealing face 71 which, when assembled within bearing 10, is directed laterally outwardly and in flush engagement with an inside surface 95, 97 of one of the closure members 55, 57 (FIGS. 1-3). When seal 15 is at rest and in an unassembled condition, sealing face 71 is oriented such that angle $\alpha$ (FIG. 5) is approximately eight degrees (preferably 7°40'). Stabilizing segment 69 defines, in like manner, a free, radially innermost end face 73 which, when assembled within bearing 10, is directed substantially radially inwardly toward rotational axis 75 (FIGS. 1-3). When seal 15 is at rest and in an unassembled condition, free end face 73 is oriented such that angle $\beta$ is approximately ten degrees (FIG. 5).

Projecting laterally outwardly from the midsection of convex surface 76 is a flange 77 which demarcates body 65 into segments 67, 69 (FIGS. 1-6). Flange 77 extends only a short distance and defines a distal end face 79 oriented at an inclination angle $\phi$. Angle $\phi$ is preferably approximately twenty degrees (FIG. 5). Flange 77 further includes a radially inner surface 81 adapted for mounting seal 15 onto shoulder 46 of inner race 39 and a radially outer surface 83 which forms a portion of the boundary for pocket 16.

In assembled condition, seals 15 are placed on inner race 9 by tautly wrapping annular flanges 77 about shoulders 46 (FIGS. 1-3). More specifically, this arrangement tightly presses each inner surface 81 of flange 77 against a shoulder 46 of inner race 39 to form a first sealing interface 91 and prevent rotation of seals 15 with respect to inner race 39. Each flange 77 extends inwardly along one shoulder 46 until distal end face 79 nearly engages balls 45. Spacing is normally maintained between balls 45 and distal end face 79 so as to avoid additional frictional forces in the bearing and premature wearing of flange 77. To enhance the sealing arrangement thereby formed, the length of inner surface 81 is maximized by inclining distal end face 79 at angle $\phi$, such that inner surface 81 extends across nearly the entire corresponding shoulder 46.

A second sealing interface 93 is formed by pocket segment 67 extending arcuately outward so that sealing face 71 is slidingly engaged with the interior sidewall 95, 97 of one of the closure members 55, 57. Closure members 55, 57 are secured to bearing 10 such that they rotate with outer race 47, and are in a rotatable relationship with seals 15 (FIGS. 1-3). Sealing face 71 is flush with sidewall 95, 97 to form a wiper seal therewith and thereby preclude the seepage of grease. Similar to flange 77, pocket segment 67 is spaced radially a small distance from the rotating outer race 47 to, likewise, avoid additional frictional forces in the bearing and premature wearing of seal 15.

Stabilizing segment 69 acts to stabilize seal 15 within bearing assembly 10 and to position flange 77 properly on shoulder 46 of inner race 39. More specifically, convex surface 76 along stabilizing segment 69 adjacent flange 77 is pressed against sidewall 101 of inner race 39, to limit and set the projection of flange 77 inwardly toward balls 45 so as to provide a fail-safe positioning means therefor. From this position, stabilizing segment 69 bends arcuately outward until tip 103 engages the interior surface 95, 105 of closure member 55 or rigid seal member 31, respectively, although such an engagement is not essential.

Figure 4:
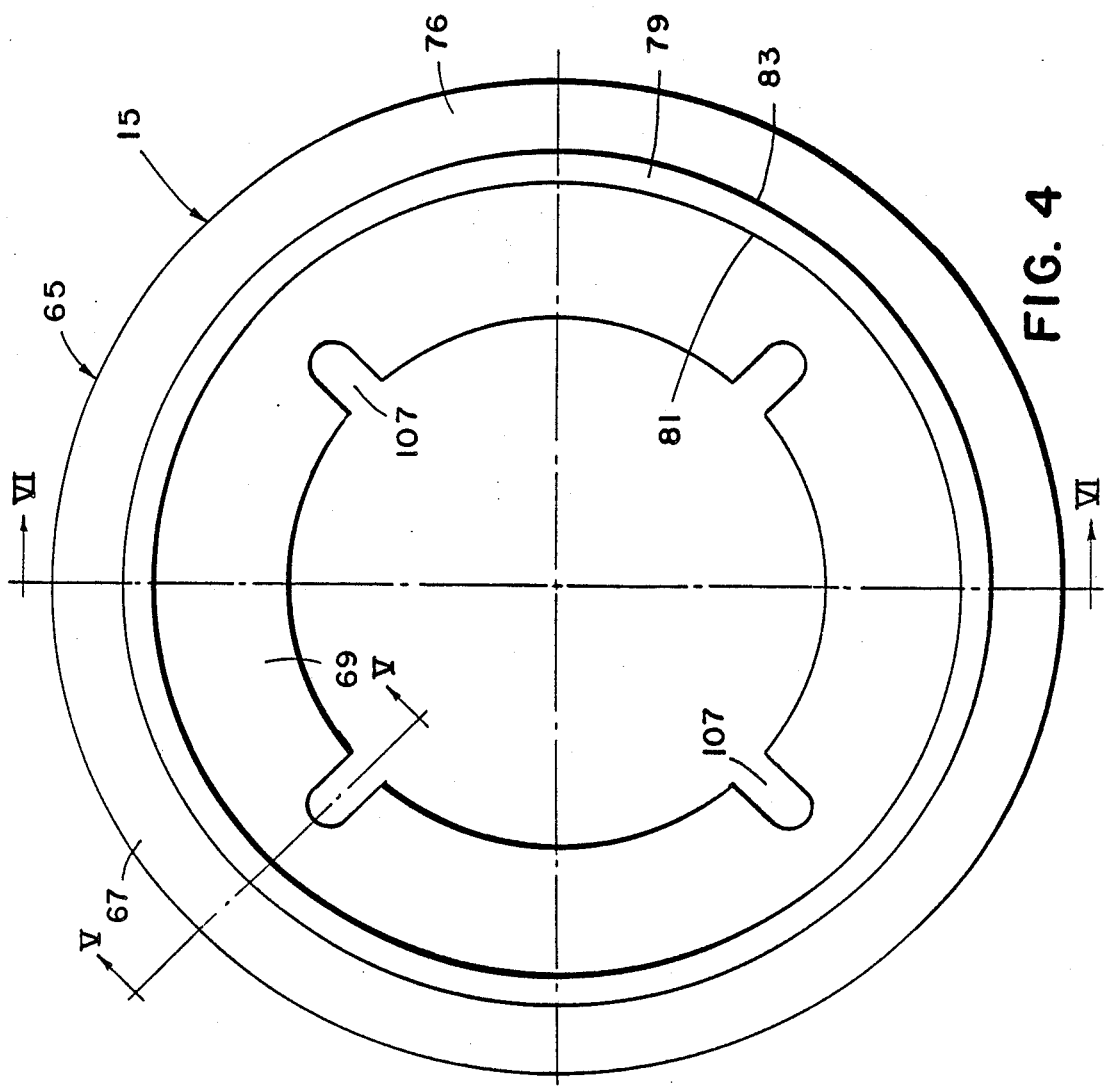
Figure 6:
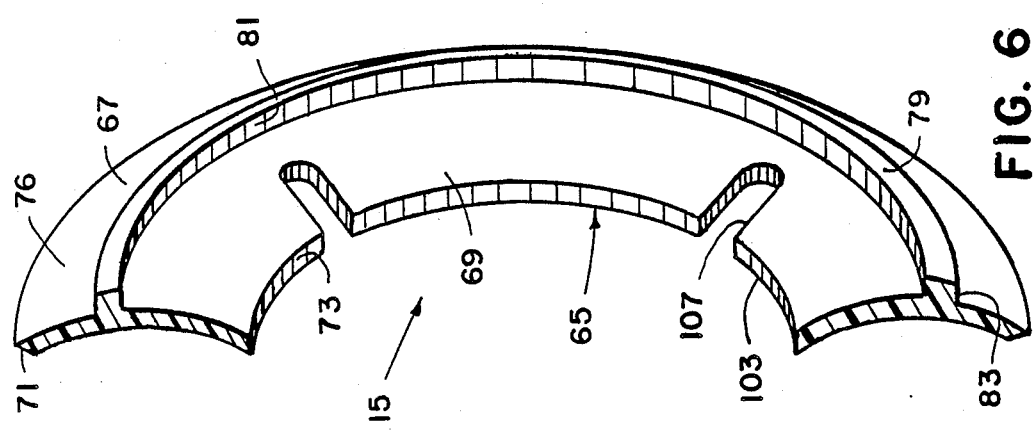
FIG. 6 is a fragmentary, perspective view of the seal.

Tip 103 of stabilizing segment 69 may be provided with a plurality of notches 107 (FIGS. 4-6). Notches 107 create passages designed to ensure the free flow of air between space 109 and cavity 11, when tip 103 engages closure member 55. Notches 107 act to obviate the risk of creating a vacuum in space 109, due to the movement of parts and seals 15 of a semi-precision bearing, which could siphon or pump the grease out of pocket 16 and cause premature spoiling of the bearing assembly 10.

As clearly seen in FIGS. 1 and 2, seals 15 are applicable to a variety of different types of semi-precision bearings. As an example, seals 15 are shown in use with the two illustrated embodiments 10, 10' which are designed for different coupling arrangements. Moreover, seals 15 may also be used in bearings of the caged or retainer type.

Seals 15 are particularly adapted for use in semi-precision bearings, such as illustrated in FIGS. 1 and 2, which possess an inherent looseness in their construction. More specifically, the resilient nature of seals 15 are able to absorb and compensate for the various bearing movements including radial play/diametric clearance, end play/axial movement and "free rock" or rocking motion between inner and outer races 39, 47 and ball members 45 to maintain a low-friction sealing contact at all times. Sealing interfaces are formed along shoulder 46 by flange 77 and closure members 55, 57 by sealing face 71, and are oriented and stabilized through the provision of segment 69 engaging side 101 of inner race 39 and interior surfaces 95, 105 so that the lubricating grease is confined in pocket 16. This construction, then, precludes grease seepage and requires only a small amount of grease to greatly enhance the economic use of modern greases.

Of course, it is understood that the above are merely preferred embodiments of the invention, and that various other embodiments as well as many changes and alterations may be made without departing from the spirit and broader aspects of the invention as defined in the claims.

The embodiments of the invention in which an exclusive property or privilege is claimed are defined as 1. A bearing assembly comprising:
   an inner race;
   an outer race;
   a number of balls confined for movement between said inner and outer races;
   at least one closure member being positioned to extend along a side of said bearing assembly; and
   at least one annular seal including a flexible, resilient body having a substantially cup-shaped cross-sectional configuration and a flange projecting therefrom, said seal being positioned between said balls and said closure member such that said flange sealingly engages said inner race, a first portion of said body sealingly engages said closure member, and a second portion of said body engages a side of said inner race to stabilize and position said seal, whereby lubricating material is substantially confined to said balls by said seal.

2. The bearing assembly of claim 1 in which said body defines a convex surface and an opposite concave surface, and in which said flange projects laterally from said convex surface in a direction substantially toward said balls to lie along an outer peripheral surface of said inner race in sealing engagement therewith.

3. The bearing assembly of claim 2 in which said flange includes an inner surface in sealing engagement with said inner race, an outer surface, and a distal end face positioned adjacent to said balls in a spaced relationship therewith, said distal end face being inclined such that said inner surface has a longer projection from said body than said outer surface, whereby said sealing engagement is maximized while maintaining a spaced relationship between said balls and said distal end face.

4. The bearing assembly of claim 3 in which said body includes a pair of opposite ends and is oriented such that it arcuately bends away from said balls and toward said closure member at said ends.

5. The bearing assembly of claim 4 in which said second portion of said seal includes one of said ends adapted to engage said closure member, said one end further includes means for defining a passage therethrough to obviate the risk of creating a vacuum between said seal and said closure member and thereby preclude the inadvertent pumping of the lubricating material from the balls.

6. The bearing assembly of claim 5 in which said body sealingly engages said closure member adjacent to the outer race in a spaced relationship to said outer race, whereby additional frictional forces and premature wearing of the seal are avoided.

7. The bearing assembly of claim 1 in which said flange includes an inner surface in sealing engagement with said inner race, an outer surface, and a distal end face positioned adjacent to said balls in a spaced relationship therewith, said distal end face being inclined such that said inner surface has a longer projection from said body than said outer surface, whereby said sealing engagement is maximized while maintaining a spaced relationship between said balls and said distal end face.

8. The bearing assembly of claim 1 in which said body includes a pair of opposite ends and is oriented such that it arcuately bends away from said balls and toward said closure member at said ends.

9. The bearing assembly of claim 1 in which said second portion of said seal includes means for defining a passage therethrough to obviate the risk of creating a vacuum between said seal and said closure member and thereby preclude the inadvertent pumping of the lubricating material from said balls.

10. A bearing assembly comprising:
    an inner race having an outer peripheral surface;
    an outer race;
    a number of balls confined for movement between said inner and outer races;
    at least one closure member positioned to extend along a side of said bearing assembly; and
    at least one flexible, resilient seal including an annular body having a substantially cup-shaped cross-sectional configuration defining a convex surface and a concave surface, and a substantially linear flange projecting laterally from said convex surface, said seal being positioned between said balls and said closure member such that said flange lies along and sealingly engages said outer peripheral surface of said inner race and said body sealingly engages said closure member, whereby lubricating material is confined to said balls by said seal.

11. The bearing assembly of claim 10 in which said flange includes an inner surface in sealing engagement with said inner race, an outer surface, and a distal end face positioned adjacent to said balls in a spaced relationship therewith, wherein said distal end face is inclined such that said inner surface has a longer projection from said body than said outer surface, whereby said sealing engagement is maximized while maintaining a spaced relationship between said balls and said distal end face.

12. The bearing assembly of claim 10 in which said convex surface of said body engages a side of said inner race, whereby said flange is properly positioned along a marginal peripheral surface of said inner race and in spaced relation with said balls.

13. The bearing assembly of claim 12 in which said flange includes an inner surface in sealing engagement with said inner race, an outer surface, and a distal end face positioned adjacent to said balls in a spaced relationship therewith, said distal end face being inclined such that said inner surface has a longer projection from said body than said outer surface, whereby said sealing engagement is maximized while maintaining a spaced relationship between said balls and said distal end face.

14. The bearing assembly of claim 12 in which said body engages said closure member at two spaced apart locations, and in which said body further includes means for defining a passage therethrough to obviate the risk of creating a vacuum between said seal and said closure member and thereby preclude the inadvertent pumping of the lubricating material from said balls.

15. The bearing assembly of claim 14 in which said portion of said body engaging a side of said inner race includes an end adapted to engage said closure member, and in which said passage defining means includes at least one notch in said one end of said body, whereby the free flow of air is permitted to pass from either side of said body.

16. The bearing assembly of claim 10 in which said body sealingly engages said closure member adjacent to the outer race in a spaced relationship to said outer race, whereby additional frictional forces and premature wearing of the seal are avoided.

17. The bearing assembly of claim 10 in which said body engages said closure member at two space apart locations, and in which said body further includes means for defining a passage through said seal to obviate the risk of creating a vacuum between said seal and said closure member and thereby preclude the inadvertent pumping of the lubricating material from the raceway.

18. The bearing assembly of claim 17 in which said body further includes a pair of opposite ends which engage said closure member at said two spaced apart locations, and wherein said passage defining means includes at least one notch in one of said ends.

19. A resilient seal for use in a bearing having an inner race, an outer race, a number of balls confined between said inner and outer races, and at least one closure member positioned along the side of said races, wherein said seal comprises a flexible, resilient annular body having a substantially cup-shaped cross-sectional configuration and a flange projecting therefrom, wherein said seal is positioned between the balls and the closure member such that said flange sealingly engages the inner race, and wherein said body includes a first portion which sealingly engages said closure member and a second portion which engages a side of the inner race to stabilize and position said seal when mounted into the bearing, whereby lubricating material is substantially confined to said balls by said seal.

20. The seal of claim 19 in which said flange further includes an inner surface, an outer surface and an inclined distal end face which is oriented such that said inner surface has a longer projection from said body than said outer surface, whereby the sealing engagement between the flange and the inner race is maximized while maintaining a spaced relationship between said balls and said distal end face.

21. The seal of claim 19 in which said body further includes, to one side of said flange, means for defining a passage which permits air to freely pass through said seal, whereby said seal is precluded from creating a vacuum between itself and the closure member when assembled within a bearing, and thereby inadvertently pumping the lubricating material away from the balls.

22. The seal of claim 21 in which said body further includes a pair of opposite ends, and wherein said passage defining means includes at least one notch in one of said ends.

* * * * *

UNITED STATES PATENT AND TRADEMARK OFFICE
CERTIFICATE OF CORRECTION

PATENT NO. : 4,863,293

DATED : September 5, 1989

INVENTOR(S) : Frederick R. Sytsma

It is certified that error appears in the above-identified patent and that said Letters Patent is hereby corrected as shown below:

Column 2, line 11:

"bearings" should be --bearing--.

Column 2, line 16:

After "assembly of" insert --Fig. 1;--.

Column 2, line 26:

After "3)" insert --.--.

Column 2, line 45:

"th" should be --the--.

Column 3, line 30:

After "1-3" insert --)--.

Column 4, line 4:

"9" should be --39--.

Column 4, line 47:

"cavity 11" should be --cavity 111--.

UNITED STATES PATENT AND TRADEMARK OFFICE
CERTIFICATE OF CORRECTION

PATENT NO. : 4,863,293

DATED : September 5, 1989

INVENTOR(S) : Frederick R. Sytsma

It is certified that error appears in the above-identified patent and that said Letters Patent is hereby corrected as shown below:

Column 7, claim 17, line 14:

"space" should be --spaced--.

Signed and Sealed this

Eighteenth Day of September, 1990

Attest:

HARRY F. MANBECK, JR.

*Attesting Officer*       *Commissioner of Patents and Trademarks*